United States Patent [19]

Wada

[11] 4,419,697

[45] Dec. 6, 1983

[54] FACSIMILE APPARATUS

[75] Inventor: Yoshinori Wada, Tokyo, Japan

[73] Assignee: Ricoh Company, Ltd., Tokyo, Japan

[21] Appl. No.: 321,520

[22] Filed: Nov. 13, 1981

[30] Foreign Application Priority Data

Nov. 20, 1980 [JP] Japan .............................. 55-163780
Nov. 20, 1980 [JP] Japan .............................. 55-163781
Dec. 26, 1980 [JP] Japan .............................. 55-184115
Dec. 29, 1980 [JP] Japan .............................. 55-186709

[51] Int. Cl.³ ............................................. H04N 1/32
[52] U.S. Cl. ................................. 358/257; 358/258; 358/287
[58] Field of Search .............. 358/258, 257, 256, 287, 358/280

[56] References Cited

U.S. PATENT DOCUMENTS 4,249,216 2/1981 Kanda ................................. 358/257
4,303,948 12/1981 Arai .................................... 358/257
4,320,419 3/1982 Cottriall ............................. 358/258
4,345,276 8/1982 Colomb .............................. 358/258

FOREIGN PATENT DOCUMENTS 2026282 1/1980 United Kingdom ................ 358/258

Primary Examiner—Howard Britton

Attorney, Agent, or Firm—David G. Alexander

[57] ABSTRACT

A facsimile apparatus is disclosed which, in a standby condition, displays the date and time, in a transmission mode displays the name of a receiving facsimile apparatus and the page number, prints out the name of the receiving apparatus, time of transmission, number of sheets transmitted, occurrence of failures on the facsimile and the like, and adds the time of transmission, name of the receiving apparatus and page number to video data to be transmitted, and in a reception mode displays the name of a transmitting apparatus and page number while printing out the name of the transmitting apparatus, time of reception, page number, occurrence of failures on the facsimile and the like. The size of extra data to be added to video data is varied at a transmitting apparatus depending on the type of a receiving apparatus: a comparatively large size for an analog (G II) type apparatus and a comparatively small size for a digital (G III) type apparatus. The positional relationship among extra data in the horizontal scan direction is automatically varied to match with a specific sheet width employed at a receiving apparatus. Only those portions of video data read from a document necessary for reproduction of extra data are occupied by the extra data on a copy sheet, thereby allowing a minimum of video data reproduced from a document to be lost.

10 Claims, 12 Drawing Figures

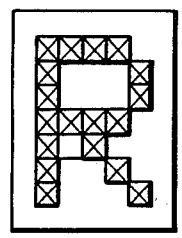
Fig. 2a
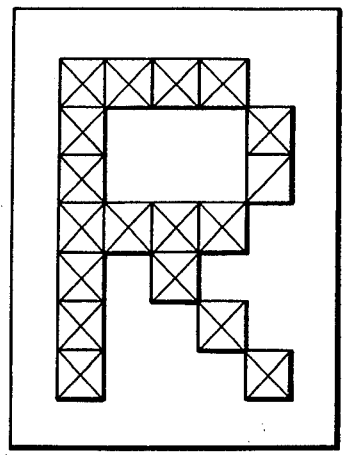
Fig. 2b
Fig. 3a
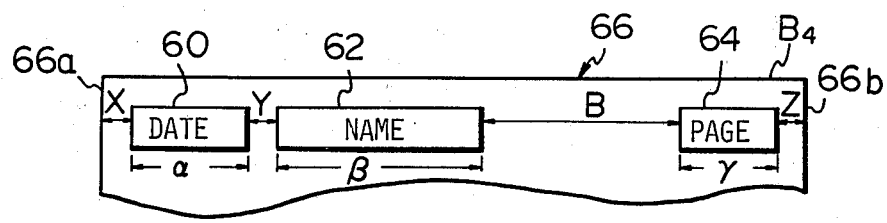
Fig. 3b
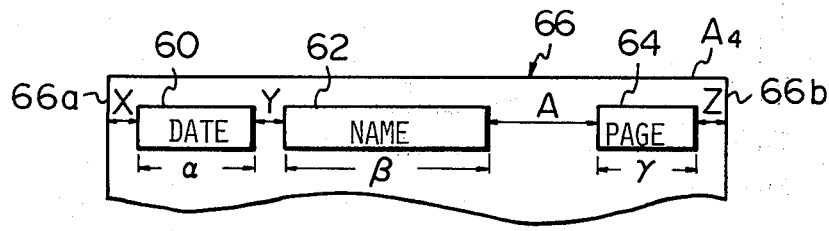

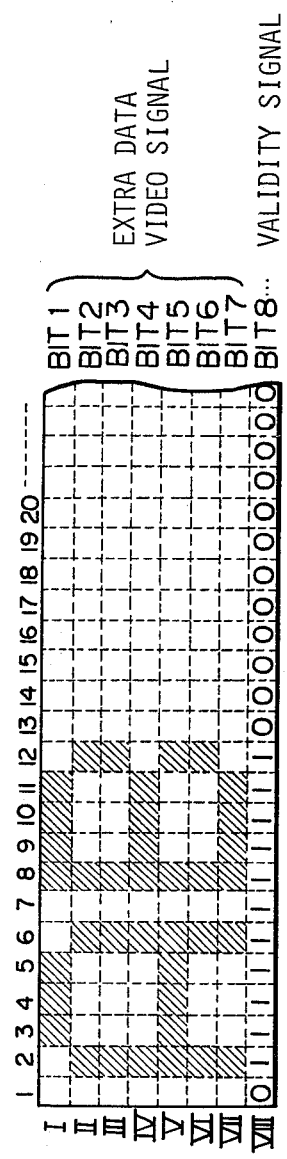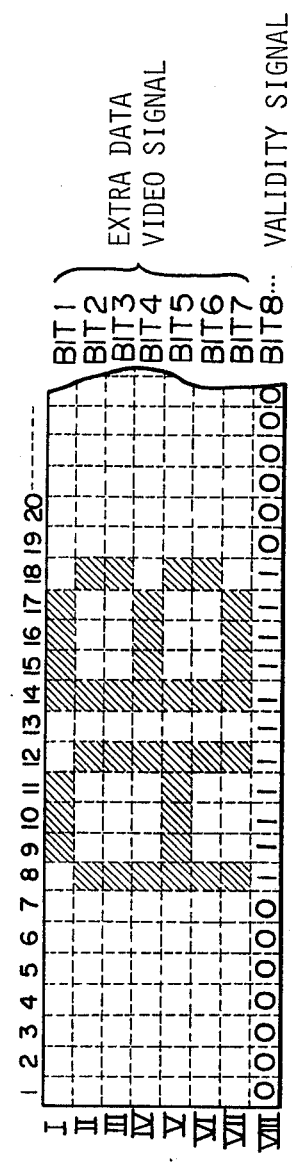

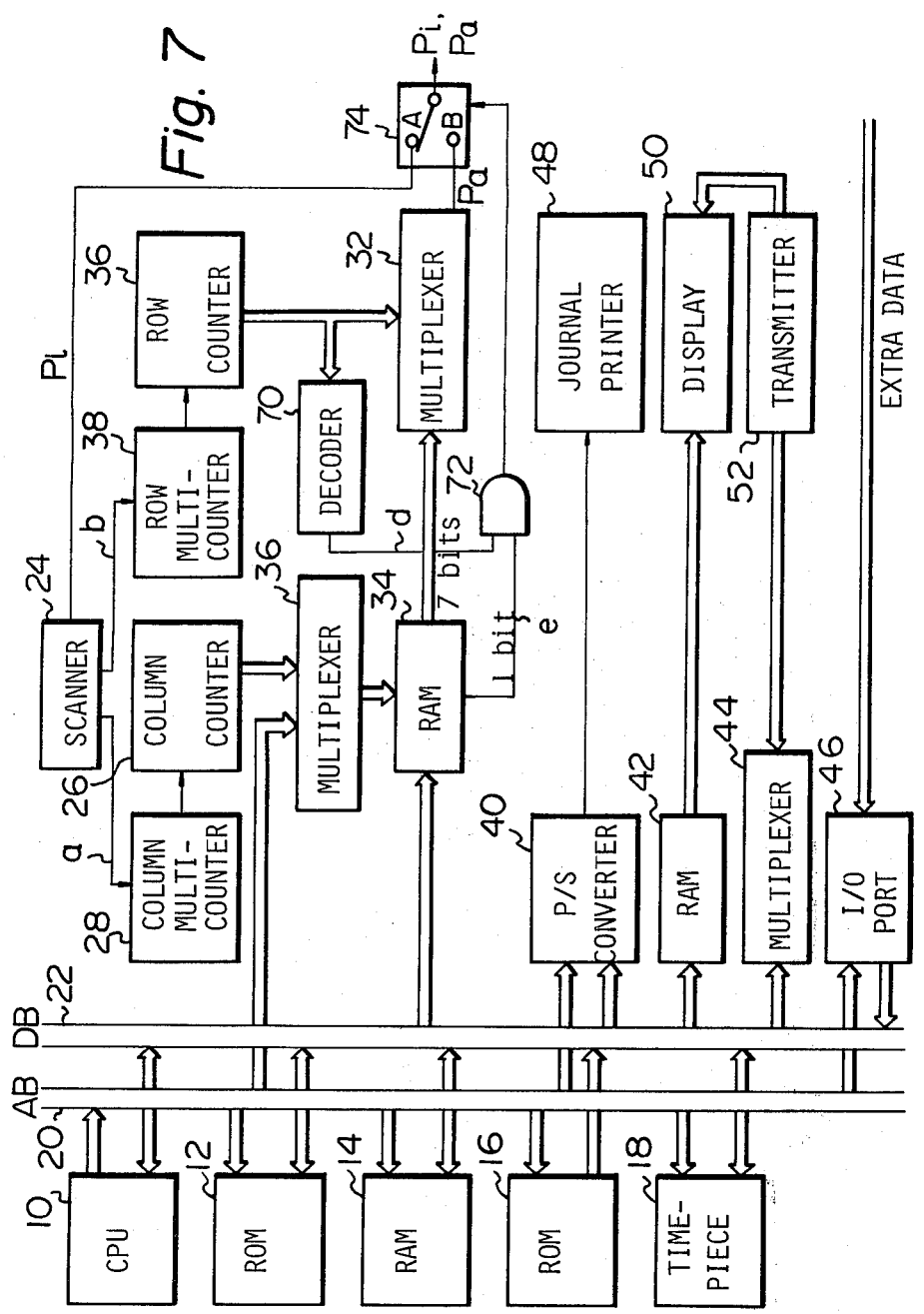

FACSIMILE APPARATUS

BACKGROUND OF THE INVENTION

The present invention relates to a facsimile apparatus which is capable of printing on a sheet of paper various extra data which are absent on an original document such as the name of a transmitting apparatus, date and time of transmission and number of pages.

When in facsimile communication a facsimile apparatus transmits video data read from an original document to a remote facsimile apparatus, it is desired that the receiving apparatus can reproduce on a paper sheet various extra or additional data which are absent on the document but desired for future reference, together with the video data read from the document. This demand has hitherto been implemented by provision of a storage having a capacity to accommodate one line of extra data. Character patterns representing desired extra data are read from the storage when a predetermined scan position is reached by a scanner. From the character patterns, pattern data (video data) made up of a given number of picture elements are prepared by a character generator and, then, extra video signals are picked up from the pattern data in correspondence with horizontal and vertical scan positions. The extra video signals are reproduced on a paper sheet in place of video signals supplied from a scanner.

Thus, the receiving apparatus can reproduce some extra data on a paper sheet such as the date and time of communication, name of a transmitting apparatus and page number. However, neither the transmitting apparatus nor the receiving apparatus is allowed to reproduce other detailed data on the facsimile such as the time of an end of communication and occurrence of failures. This is the first problem heretofore left unsolved in connection with the prior art facsimile apparatus.

A second problem originates from the fact that the extra or identification data to replace video data from the scanner are provided with a specific size which matches with a line density in at least one of vertical and horizontal scan directions. Since the character size is varied in accordance with a line density at a receiving transceiver, a reproduced character is clear in a digital or synchronous type apparatus but unclear in an analog or asynchronous type apparatus though the line densities may be the same.

A third problem results from the prior art practice in which extra data are always reproduced in fixed positions on a paper sheet regardless of a sheet width at a receiving apparatus. This is naturally uncriticizable as long as the width of sheets at a receiving apparatus is the same as that at a transmitting apparatus. However, if the sheet width at the receiving apparatus is larger than that at the transmitting apparatus, the extra data on a copy sheet will appear huddled up on one side of the sheet. Conversely, extra data will be partly lost on a copy sheet if the sheet is narrower than the sheet at the transmitting apparatus.

Furthermore, one line of extra data is reproduced on a paper sheet replacing entire one line of video data read from a document, with no regard to the contents of the extra data. Stated another way, the video data supplied to a receiving apparatus have been lost throughout one line which is occupied by extra data. It follows that where one line of video data to be replaced by extra data is of great significance, addition of extra data to the video data must be avoided to preserve the significant one line of video data. This is a fourth problem hitherto encountered in the prior art apparatus.

This fourth problem may be settled by, for example, detecting the contents of extra data and preventing video data from being replaced by the extra data in areas of specific codes (e.g. white codes). Such an expedient, however, requires special means for detecting the specific codes and means for inhibiting the replacement of video data by extra data, resulting in a disproportionate intricacy of construction and high cost. Another possible implement consists in printing extra data in an area of a paper sheet other than that for printing video data, e.g. the top margin ahead of the video data printing area. However, where documents to be transmitted are standardized, this is impracticable because a recording space on a paper sheet at a receiving apparatus would grow larger than a data area on an original document to be transmitted.

SUMMARY OF THE INVENTION

It is an object of the present invention facilitate prevention of failures in facsimile communication, grasping the frequency in use in management of transmitted and received documents by recording or displaying on a time series basis various conditions of facsimile communication at transmitting and receiving apparatuses.

It is another object of the present invention to always print out clear-cut extra data by varying the dimensions of extra data at a transmitting apparatus such that a receiving apparatus reproduces characters to a comparatively large size if it is of the analog (G II) type but to a comparatively small size if it is of the digital (G III) type.

It is another object of the present invention to constantly reproduce extra data in an optimum position relative to a specific sheet width without huddling them up on one side or loosing any part thereof even though the sheet size may differ from a transmitting apparatus to a receiving apparatus.

It is another object of the present invention to minimize an amount of omission of video data attributable to the addition of extra data thereto.

It is another object of the present invention to provide a generally improved facsimile apparatus.

Other objects, together with the foregoing, are attained in the embodiments described in the following description and illustrated in the accompanying drawings.

BRIEF DESCRIPTION OF THE DRAWINGS

FIGS. 2a and 2b are views of exemplary picture element signals which are usable to settle the second problem;

FIGS. 3a, 3b and 4a, 4b are views explanatory of various manners of variation of a positional relationship among extra data, contemplated to preclude the third problem;

FIGS. 5 and 6a, 6b are views demonstrating an operation for varying the positional relationship among extra data in the manners shown in FIGS. 3a and 3b or 4a and 4b;

FIG. 7 is a block diagram of a facsimile apparatus according to another embodiment of the present invention and constructed to settle the fourth problem described.

DESCRIPTION OF THE PREFERRED EMBODIMENTS

While the facsimile apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
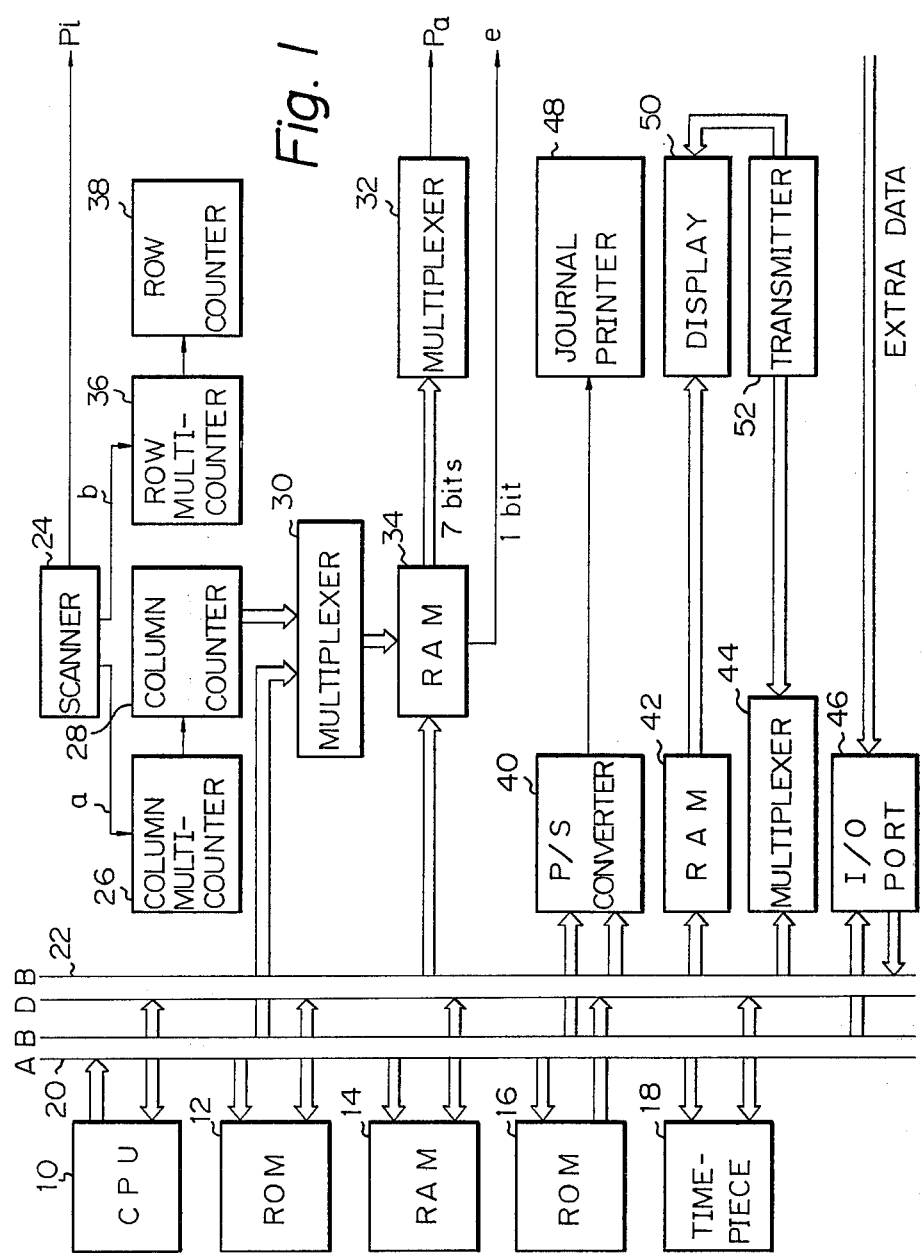
FIG. 1 is a block diagram showing a facsimile apparatus embodying the present invention and designed to preclude the first to third problems inherent in the prior art facsimile apparatus as described.

Referring to FIG. 1 of the drawings, the facsimile apparatus controlled by a microcomputer comprises a microprocessor or CPU 10, a read only memory or ROM 12, a first random access memory or RAM 14, a read only memory or ROM 16 storing a code indicative of the name of the apparatus, and a timepiece 18 providing information such as the date and time of transmission. The facsimile apparatus also comprises an address bus or AB 20, a data bus or DB 22, a scanner 24, a column multicounter 26, a column counter 28, multiplexers 30 and 32, a second random access memory or RAM 34, a row maulticounter 36 and a row counter 38. Further included in the facsimile apparatus are a parallel-to-serial converter 40, a third random access memory or RAM 42, a multiplexer 44, an I/O port 46, a journal printer 48, a display unit 50 and a transmitter 52.

The microprocessor 10, read only memory 12 and random access memory 14 are connected together through the address bus 20 and data bus 22 to control operations of the facsimile apparatus.

The random access memory 34 is loaded with data (character data) from the microcomputer via the address bus 20 and data bus 22. Each of these data is made up of 8 bits, of which 7 bits are allotted to video data and one bit is allotted to a validity signal e indicative of the presence of video data.

The read only memory 12 includes a character generator therein. The microprocessor 10 converts character codes representing, for example, the date and time of transmission, transmitter's name and page number into video data. This character code conversion may be performed on the basis of ASCII codes so that each of the resultant video data has a horizontal train of 5 dots and a vertical train of 7 dots as viewed in FIG. 2a or 2b. The video data are stored in the random access memory 34 in a manner illustrated in FIG. 6a. For such a procedure, the microcomputer is furnished with a timer, a counter and the like as I/O elements.

The random access memory 34 needs a storage capacity which is the scanning width multiplied by line density. Supposing a sheet of paper of A4 size, the scanning width will be 216 mm and the capacity of the random access memory 34 will be $(216 \times 8) = 1728$ bytes if the line density is 8 lines/mm.

The column counter 28 is adapted to count up video clock pulses (horizontal clock pulses) a supplied from the scanner 24 and drive the multiplexer 30 with its output. Column addresses of the random access memory 34 are designated by the multiplexer 30 to produce data successively 8 bits at a time in the column or vertical scan direction. The row counter 38 on the other hand counts up line sync signals b and drives the multiplexer 32 with its output. The random access memory 34 is therefore caused by the multiplexer 32 to produce data successively in the row or horizontal scan direction. The output of the multiplexer 32 is an extra video data signal Pa.

The column multicounter 26 and row multicounter 36 serve to vary the magnification of characters in the horizontal scan and vertical scan directions, respectively. When it is desired to double the magnification, each of the multicounters 26 and 36 will have the capacity reduced to one half. In such a case, the storage capacity of the random access memory 34 needs only be one half the otherwise; 864 bytes employing the aforementioned assumption. It follows that for 1:1 magnification the multicounters 26 and 36 are needless and the video clock pulses a will be coupled directly to the column counter 28 and the line sync signals b to the row counter 38.

Using the character generator in the read only memory 12, the microprocessor 10 decomposes into each $5 \times 7$ dots of picture element the date and time supplied from the timepiece 18, transmitter's name supplied from the read only memory 16 and page number supplied from the I/O port 46, for example. The picture elements are sequentially written in the random access memory 34 via the address bus 20 and data bus 22.

The microprocessor 10 processes such various extra data into character codes. The character codes are coupled to the parallel-to-serial converter 40 and thereby transformed into serial signals. The serial output of the converter 40 is supplied to the journal printer 48 which then prints it out on a sheet of paper. The random access memory 42 has a capacity of $16 \times 8$ bits and is loaded with character codes to be displayed. Addresses from the transmitter 52 are passed through the multiplexer 44 to the random access memory 42 to designate the addresses of the latter so that the output data of the random access memory 42 are indicated on the display unit 50.

With the facsimile apparatus thus constructed, favorable management of data can be achieved in facsimile communication. In detail, in a stand-by condition, the facsimile apparatus shows the date and time constantly on the display unit 50. In a transmission mode, it displays its name and the number of pages transmitted, prints out at the journal printer 42 various extra data such as the date, time of transmission, name of a receiving apparatus, number of pages to be transmitted and occurrence of a failure, and adds such extra data to video data read from a document. In a reception mode, it displays the name of a transmitting apparatus and the number of pages to be received, and prints out at the journal printer 48 various extra data such as the transmitter's name, time a reception, number of pages received and occurrence of a failure. It will be seen that the construction and operation discussed succeed in settling the first problem concerning a permanent record of detailed extra data.

While in this embodiment one character is represented by $5 \times 7$ dots as seen in FIGS. 2a or 2b, the total number of dots is $7 \times 9$ inclusive of the blank rows and columns therearound. Therefore, the column counter 28 comprises a 1/1024 counter and row counter 38 a 1/9 counter. The multiplexer 32 produces a signal from the random access memory 34 by vertical 7 bits and a blank or white signal by the remaining 2 vertical bits. Examples of the resultant picture element signals to be delivered from the multiplexer 32 are shown in FIGS. 2a and 2b. The extra data are printed on a paper sheet in place of video data supplied from the scanner 24 at a receiving apparatus, in a comparatively large size as in FIG. 2a when the receiving apparatus is of the analog type or in a comparatively small size as in FIG. 2b when it is of the digital type.

In this way, extra data can be reproduced sharply on a paper sheet at a receiving apparatus regardless of the type of the receiving apparatus: in a comparatively small size in the case of a digital type apparatus and a comparatively large size in the case of an analog type apparatus as stated above. It will be seen that this effectively eliminates the second problem heretofore experienced in connection with clear reproduction of extra data.

An expedient which the present invention proposes to settle the third problem concerned will be described hereinafter.

In facsimile communication, transmission of video data from one facsimile apparatus to another is usually preceded by the delivery of information on various functions furnished with in the receiving apparatus such as a sheet size, a line density and a transmission rate to the transmitting apparatus. Comparing the available functions of the receiving apparatus with its own, the transmitting apparatus selects matching ones of the functions to designate the receiving apparatus to function accordingly.

Extra data can be reproduced in appropriate positions on a paper sheet if a sheet width accommodating the extra data is determined on the basis of a relation between a sheet size at a transmitting apparatus and that at a receiving apparatus as indicated in Table 1, for example, and if the positions where the extra data are to replace video data are adjusted to be fully accommodated in the determined sheet width. In Table 1, the characters A and B represent the sheet sizes of A4 and B4, respectively. It should be noted, however, these A4 and B4 sizes are not limitative but only illustrative.

TABLE 1

| SHEET WIDTH AT TRANSMITTER | SHEET WIDTH AT RECEIVER | SHEET WIDTH FOR EXTRA DATA |
| --- | --- | --- |
| A | A | A |
| A | B | A |
| B | A | A |
| B | B | B |

Referring to FIGS. 3a and 3b, there are shown two examples of adjustment of extra data positions based on a determined sheet width for extra data. The extra data are assumed herein to consist of the data of communication 60, name of a transmitting apparatus 62 and page number 64. The spaces for accommodating these data 60, 62 and 64 have lengths α, β and γ, respectively. X denotes the spacing between the left end 66a of the sheet 66 and the date 60, Y the spacing between the date 60 and the name 62, and Z the spacing between the page number 64 and the right end 66b of the sheet 66. As shown, the spacing between the name 62 and the page number 64 alone is varied to the shorter spacing A or the longer spacing B according to Table 1 while maintaining the other factors α, β, γ, X, Y and Z constant.

Figure 4A:
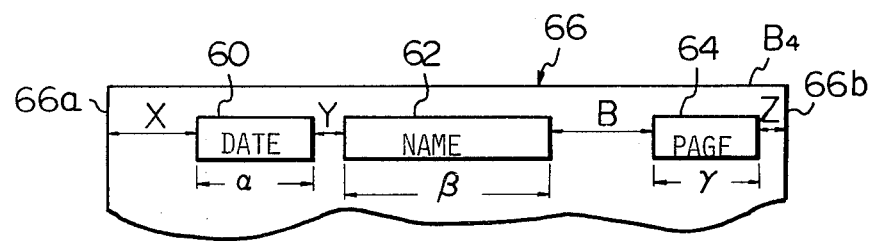
Figure 4B:
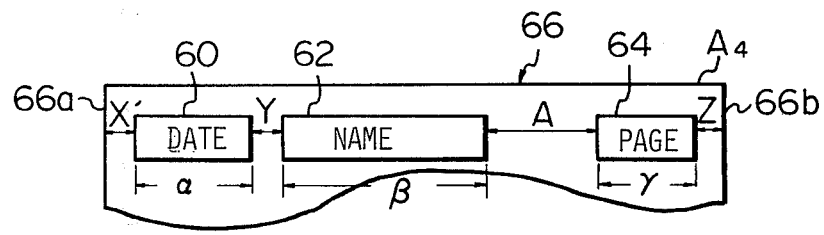

Alternatively, as viewed in FIGS. 4a and 4b, the spacing X between the left end 66a of the sheet and the date 60 and/or the spacing Z between the right end 66b of the sheet and the page number 64 may be varied as well as the spacing A or B in accordance with a determined sheet width for extra data.

Turning back to FIG. 1, description will be made on the adjustment of the spacing A or B of FIGS. 3a and 3b at a transmitting apparatus. The read only memory 12 stores therein a program for producing extra data and a program for varying extra data positions on a paper sheet in accordance with the determined sheet width for extra data (A or B) and replacing video data with them. The second random access memory 34 picks up necessary extra data out of the read only memory 12 and stores one line of such data therein while relocating them in accordance with the sheet width A or B.

Figure 5:
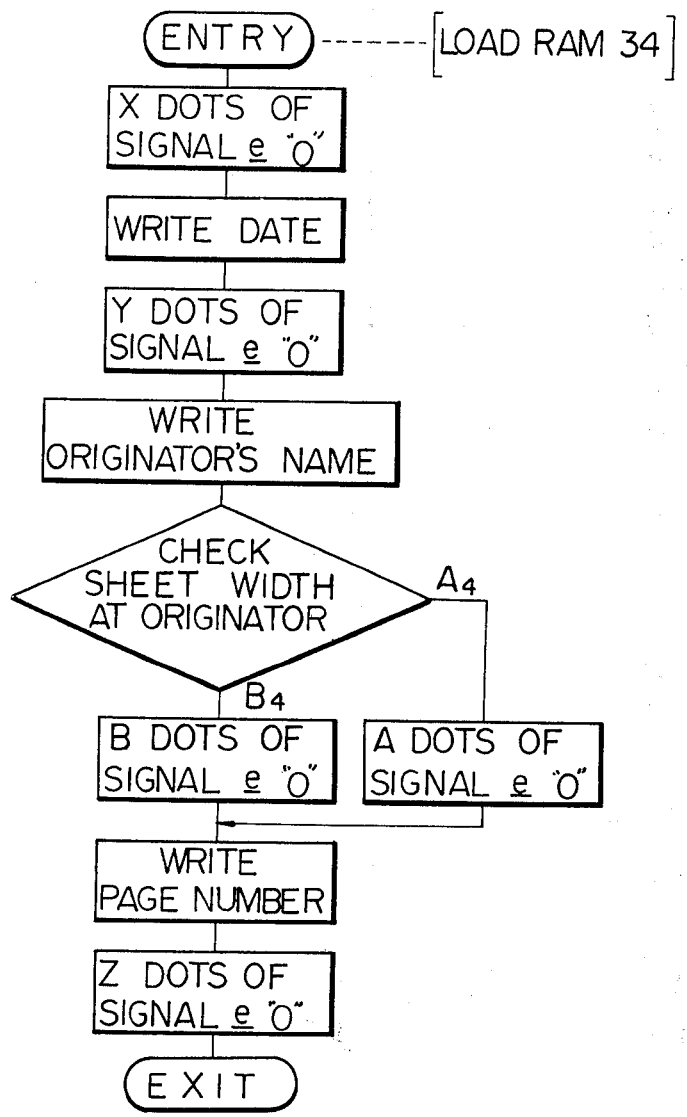

The microprocessor 10 is operated as shown in FIG. 5 according to the programs to read character data necessary for extra data from character data stored in the read only memory 12 and load the read character data in the random access memory 34.

Suppose that the random access memory 34 has stored character data as shown in FIG. 6a or 6b. The horizontal addresses correspond to individual dot positions in a horizontal scan direction of a facsimile apparatus while the vertical addresses correspond to individual dot positions in a vertical scan direction. As previously stated, one character of extra data is represented by $5 \times 7 = 35$ picture elements. The microprocessor 10 sequentially designates the horizontal addresses of the random access memory 34 via the address bus 20 and multiplexer 30 so as to sequentially load it with the date, name and page number through the data bus 22 in accordance with the determined sheet width for extra data as shown in FIG. 3a or 3b. In each location defined by the final vertical address (VIII) and a horizontal address, the random access memory 34 is also loaded with the validity signal e indicative of the presence/absence of extra data in the corresponding 7 vertical bits.

The extra data thus written in the random access memory 34 are sequentially read in synchronism with scanning actions of the scanner 24. While the validity signal e is logical "0", video data provided by the scanner are transmitted to the receiving apparatus. While the same signal is logical "1", extra data produced from the random access memory 34 are transmitted to the receiving apparatus. Then, the receiving apparatus will reproduce all the extra data without omission.

In the illustrated embodiment, extra data are stored in advance in the random access memory 34 in the manner shown in FIG. 3a or 3b and read therefrom in synchronism with the scans of a document, so that the extra data can be safely produced despite any increase in the scanning rate.

Though the adjustment of extra data positions has been shown and described as being performed at a transmitting apparatus, it will be seen that the same operation can be effected by a receiving apparatus to reproduce extra data in optimum positions on a paper sheet.

Thus, in accordance with this embodiment, a difference in sheet size between a transmitting apparatus and a receiving apparatus is not criticizable in reproducing extra data always in optimum positions without the extra data being huddled up or lost.

Another embodiment of the present invention designed to settle the fourth problem will be described with reference to FIGS. 7 and 8. In the block diagram of FIG. 7, the same elements as those of FIG. 1 are denoted by the same reference numerals and will not be described any further.

Referring to FIG. 7, the reference numerals 70, 72 and 74 designate a decoder, an AND gate and an electronic switch, respectively. The decoder 70 decodes an output of the row counter 38 and produces an output d only at those scan lines where extra data are to be added. The decoder output d is coupled to the AND gate 72.

When the output of the AND gate 72 is absent, the electronic switch 74 remains in engagement with a contact A as shown in the drawing to continuously deliver video signals Pi from the scanner 24. Upon appearance of the output of the AND gate 72, the electronic switch 74 is connected to the other contact B whereby extra data Pa read from the random access memory 34 are delivered in place of the video signals Pi.

As the scanner 24 is activated to scan an original document, the column counter 28 and row counter 38 are individually supplied with video clock pulses a and line sync pulses b as previously discussed. Counting up the video clock pulses a, the column counter 28 drives the multiplexer 36 with its outputs so that the column addresses of the random access memory 34 are sequentially designated to produce data in the columns 8 bits at a time, viz., columns 1, 2, 3, 4 . . . in FIG. 6a or 6b. Of the 8 bits of data thus read from the random access memory 34, the data in the bits 1–7 are fed to the multiplexer 32. The outputs of the row counter 38 counting the line sync pulses b are supplied to the multiplexer 32 to designate the row addresses of the random access memory 34, whereby the data are produced sequentially selected in the order of I, II, III, IV . . . as shown in FIG. 6a or 6b. Consequently, the multiplexer 32 delivers extra data signals Pa for reproducing extra data through the electronic switch 74.

At the same time, data stored in the bits "8" of the random access memory 34 are read sequentially therefrom by video clock pulses a column address by column address. The resultant validity signals e are coupled to one input of the AND gate 72.

At this instant, the vertical scan has not proceeded yet to a position where extra data are to be recorded so that the decoder 70 has not produced its output d maintaining the AND gate 72 closed. This in turn keeps the switch 74 in connection with the contact A and thereby permit video signals Pi from the scanner 24 to be transmitted through the switch 74.

When the scanner 24 progressively scans the document until it reaches a vertical scan position where extra data are to be recorded, the decoder 70 produces an output d which is coupled to the AND gate 72 to open it. Then, the multiplexer 36 sequentially reads the columns in the random access memory 34 in response to the outputs of the column counter 28. Every time a validity signal e is read when datum in a bit "8" is logical "1", the signal e is coupled through the AND gate 72 to the switch 74 thereby actuating the switch 74 from the contact A to the contact B.

Therefore, the switch 74 is shifted from the contact A to the contact B every time the bits in the random access memory 34 are sequentially read as I-1, I-2, I-3 . . . I-6 and I-7, I-8, I-9 . . . I-12 to constitute an extra video signal Pa. In this position of the switch 74, the extra video signal Pa is transmitted in place of the video signals Pi from the scanner 24. When bits I-13, I-14 . . . are sequentially read to form extra video signals Pa, the validity signal e disappears since the data in the bits "8" are "0", whereby the switch 74 is kept engaged with the contact A passing the video signals Pi from the scanner 24 therethrough.

As the scanning operation farther proceeds until the vertical scan is brought out of the position for reproducing extra data, the decoder 70 stops producing the output d in response to an output of the row counter 38 and thereby closes the AND gate 72. Therefore, the switch 74 is no longer supplied with the signal e and kept in connection with the contact A to continuously deliver video signals Pi from the scanner 24.

Figure 8:
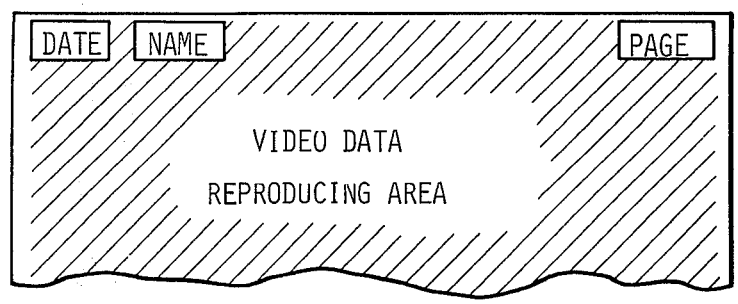
FIG. 8 is a view showing extra data reproduced on a copy sheet by the facsimile apparatus of FIG. 7.

A copy sheet produced by the above procedure is shown in FIG. 8. In the hatched video data reproducing area, only those portions where extra data are actually printed are lost and the omission of video data due to the added extra data is minimized. This is contrastive to the prior art facsimile apparatus in which the date and time of transmission, name of a transmitting apparatus and other extra data must be reproduced at the sacrifice of entire one line of video data.

Though not described in the foregoing embodiments, it will be apparent to those skilled in this art that the video signals Pi output from the scanner 24 or switch 74 are transmitted to a receiving apparatus through a modem after being subjected to data compression or like desired operation, and reproduced at the receiving apparatus as usual.

While a microcomputer and a random access memory have been used in the embodiments to generate extra data, it will be seen that use may be made of a known counter and character generator for the same purpose.

Each of the embodiments has been described in connection with a transmitting apparatus, but it is also applicable to a receiving apparatus if an arrangement is made such that the receiving apparatus adds necessary extra data to received video data by suitably switching them from one to the other.

Furthermore, video data necessary for the reproduction of extra data are stored in a random access memory in the foregoing embodiments so that transient extra data such as date and time can be recorded easily and automatically.

Various modifications will become possible for those skilled in the art after receiving the teachings of the present disclosure without departing from the scope thereof.

What is claimed is:

1. A facsimile apparatus comprising:
   scanner means for scanning an original document to produce video data to be transmitted;
   microcomputer means having a central processing unit, a read only memory containing an operating program and a first random access memory;
   a second random access memory for storing extra or additional data which are absent on the original document;
   replacing means for replacing a part of the video data from the original document with the additional data;
   display means for displaying the additional data; and
   printing means for printing the additional data on a recording medium;
   in a transmission mode, said display means being controlled to display the name of a receiving facsimile apparatus and the page number, said printing means being controlled to print out the name of the receiving apparatus, time of transmission, number of sheets transmitted and occurrence of failures during transmitting;

in a reception mode, said display means being controlled to display the name of a transmitting facsimile apparatus and the page number, said printing means being controlled to print out the name of the transmitting apparatus, time of reception, page number and occurrence of failures during receiving.

2. A facsimile apparatus as claimed in claim 1, in which in the transmission mode the time of transmission, name of the transmitting apparatus and page number are added to the video data from the document.

3. A facsimile apparatus as claimed in claim 1, in which in the transmission mode the character size of the additional data is varied depending on the type of the receiving apparatus such that the additional data are transmitted to the receiving apparatus in a comparatively large character size for an analog type receiving apparatus and in a comparatively small character size for a digital type receiving apparatus.

4. A facsimile apparatus as claimed in claim 1, in which the positional relationship among the additional data in the horizontal scan direction is varied to match with a size of the recording medium selected at the receiving apparatus.

5. A facsimile apparatus comprising:
scanner means for scanning an original document to produce video data to be transmitted;
microcomputer means having a central processing unit, a read only memory containing an operating program and a first random access memory;
a second random access memory for storing extra or additional data which are absent on the original document;
replacing means for replacing a part of the video data from the original document with the additional data;
display means for displaying the additional data; and
printing means for printing the additional data on a recording medium;
in a stand-by condition, the display means being controlled to display the date and time;
in a transmission mode, said display means being controlled to display the name of a receiving facsimile apparatus and the page number, said printing means being controlled to print out the name of the receiving apparatus, time of transmission, number of sheets transmitted and occurrence of failures during transmitting;
in a reception mode, said display means being controlled to display the name of a transmitting facsimile apparatus and the page number, said printing means being controlled to print out the name of the transmitting apparatus, time of reception, page number and occurrence of failures during receiving; and
switching means for switchingly selecting either the video data or the additional data to be transmitted, said switching means being controlled to minimize an amount of omission or replacement of the video data with the additional data.

6. A facsimile apparatus comprising:
scanner means for scanning an original document to produce video data to be transmitted;
microcomputer means having a central processing unit, a read only memory containing an operating program and a first random access memory;
a second random access memory for storing extra or additional data which are absent on the original document; and
replacing means for replacing a part of the video data from the document with the additional data;
in a transmission mode, the character size of the additional data being varied depending on the type of a receiving facsimile apparatus such that the additional data are transmitted to the receiving apparatus in a comparatively large character size for an analog type receiving apparatus and in a comparatively small character size for a digital type receiving apparatus.

7. A facsimile apparatus comprising:
scanner means for scanning an original document to produce video data to be transmitted;
microcomputer means having a central processing unit, a read only memory containing an operating program and a first random access memory;
a second random access memory for storing extra or additional data which are absent on the original document; and
replacing means for replacing a part of the video data from the document with the additional data;
the positional relationship among the additional data in the horizontal scan direction being varied to match with a size of a recording medium selected at a receiving facsimile apparatus.

8. A facsimile apparatus as claimed in claim 7, in which the positional relationship among the additional data in the horizontal scan direction is varied in a transmission mode.

9. A facsimile apparatus as claimed in claim 7, in which the positional relationship among the additional data in the horizontal scan direction is varied in a reception mode.

10. A facsimile apparatus comprising:
scanner means for scanning an original document to produce video data to be transmitted;
microcomputer means having a central processing unit, a read only memory containing an operating program and a first random access memory;
a second random access memory for storing extra or additional data which are absent on the document and validity data indicative of the presence of the additional data;
replacing means for replacing a part of the video data from the document with the additional data; and
switching means for switchingly selecting either the video data or the additional data to be transmitted in response to the validity data;
said switching means being controlled to minimize an amount of ommission or replacement of the video data with the additional data.

* * * * *